W. G. Lavers,
Wire Stretcher.
Nº 11,378. Patented July 25, 1854.
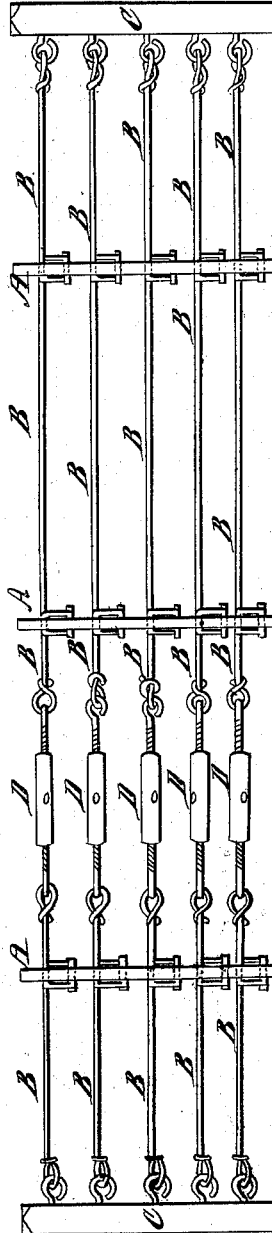
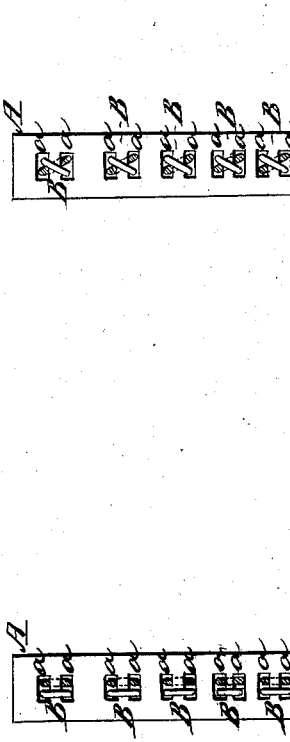
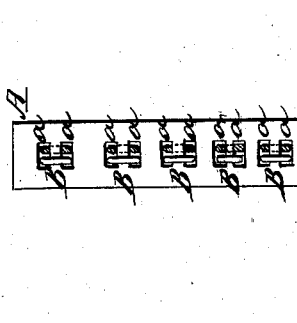

UNITED STATES PATENT OFFICE.

WILLIAM G. LAVERS, OF NEW YORK, N. Y.

DEVICE FOR SECURING ENDS OF WIRES IN FENCE-POSTS.

Specification of Letters Patent No. 11,378, dated July 25, 1854.

*To all whom it may concern:*

Be it known that I, WILLIAM G. LAVERS, of the city, county, and State of New York, have invented a new and useful Improvement in Wire Fences; and I do hereby declare that the following is a full, clear, and exact description of the same, reference being had to the annexed drawings, making a part of this specification, in which—

Figure 1, is a front view of my improved fence. Fig. 2, is a side view of one of the posts, showing the manner in which the parallel wires are secured in the posts. Fig. 3, is also a side view of a post, showing the hooks at the ends of the parallel wires as being crossed.

Similar letters of reference indicate corresponding parts in the several figures.

The nature of my invention consists in a peculiar manner of securing the horizontal and parallel wires to the posts, viz:—by means of passing the ends of said wires through slots in the posts, and forming hooks at the ends; the end of the hooks passing through slots immediately below the one first mentioned, as will be hereafter fully shown.

To enable others skilled in the art to fully understand and construct my invention, I will proceed to describe it.

A, represents the posts to which the wires, B, are attached. The posts, A, are constructed of flat metal bars, and have oblong slots, (a), made through them, at distances corresponding to the width desired between the wires, B. The slots, (a), are arranged or made through the posts in pairs, two slots being required, in order to secure the ends of two wires on the same line, the distance between the upper and lower slots of each pair of slots corresponding to the width between the wires, see Figs. 2 and 3.

The slots, (a), are oblong, and parallel to each other, their length being crosswise of the posts, A. The ends of the wires, B, are passed through the upper slots of each pair, and then bent downward in the form of hooks, the lower ends of the hooks repassing through the posts through the lower slots of each pair. The ends of the contiguous wires passing through each pair of slots, side by side, as clearly shown in Fig. 1.

The ends of the hooks may pass through the lower slots of each pair directly underneath the main portions of the wire, so that the hooks may be in a horizontal position, as shown in Fig. 2, or the hooks may be placed obliquely, so that the end of one hook will be directly underneath the wire of the adjoining hook, see Fig. 3.

C, Fig. 1, are straining posts sunk in the earth in a permanent manner, at every angle of a field or inclosure.

D, are nuts which work on right and left threads cut on the ends of the wires, B. The wires are strained or straightened by turning the nuts, D. Only one set of nuts are required for every side of a field or inclosure.

The straining posts, C, and the nuts, D, are precisely of the same construction as those used in the inner fences of Wickersham and others, and therefore require no particular description.

By having the hooks formed at the ends of the wires, B, the wires are effectually prevented from being withdrawn from the posts, A, as they are strained or tightened, by operating the nuts, D. Many devices or forms have been employed for securing the wires in the posts, but they have mostly failed in being secure against the stress put upon them. My method effectually obviates this difficulty, as will be readily seen, and the wires may be properly strained, without danger of being withdrawn from the posts.

What I claim as new, and desire to secure by Letters Patent, is:—

The method of securing the horizontal wires, B, to the posts, A, as herein shown and described, viz:—By having slots, (a), made in the posts, A, in pairs, and the ends of the wires, B, passed through the slots of the several pairs, and bent in the form of hooks, the lower ends of the hooks passing through the lower slots of the several pairs, and placed either obliquely or vertically, as set forth.

WILLIAM G. LAVERS.

Witnesses:
S. H. WALES,
J. W. HAMILTON.